United States Patent [19]

Watanabe et al.

[11] Patent Number: 5,880,226
[45] Date of Patent: Mar. 9, 1999

[54] MAGNETIC RECORDING MEDIUM

[75] Inventors: Kazuyoshi Watanabe; Noboru Watanabe, both of Mito, Japan

[73] Assignee: Victor Company of Japan, Ltd., Yokohama, Japan

[21] Appl. No.: 665,553

[22] Filed: Jun. 18, 1996

[30] Foreign Application Priority Data

Jun. 19, 1995 [JP] Japan ..................................... 7-176855

[51] Int. Cl.$^6$ .................................................. C08F 283/04
[52] U.S. Cl. ........................ 525/453; 525/454; 428/692; 428/694 B; 428/694 BU; 528/125; 528/126; 528/128; 528/222; 528/229; 528/303
[58] Field of Search ..................................... 525/453, 454; 428/692, 694 TP, 694 TR, 695, 900, 644 B, 464 BU, 341, 457; 528/125, 126, 128, 222, 229, 303

[56] References Cited

U.S. PATENT DOCUMENTS

| | | | |
|---|---|---|---|
| 4,425,404 | 1/1984 | Suzuki et al. | 428/341 |
| 5,475,066 | 12/1995 | Nikles et al. | 525/453 |
| 5,686,136 | 11/1997 | Nikles et al. | 427/127 |

FOREIGN PATENT DOCUMENTS

| | | |
|---|---|---|
| 63-193315 | 8/1988 | Japan . |
| 4-325917 | 11/1992 | Japan . |
| 6-4451 | 2/1994 | Japan . |

OTHER PUBLICATIONS

IEEE Transactions of Magnetics (29)6, 3649–3651 (1993) "Amine–Quinone Polyurethanes . . . " Liang, J. et al.

Progress in Organic Coatings 15, 63—71 (1987) "A Novel Coating Based on . . . " Kaleem, K. et al.

J. Applied Science, 42–2893–2897 (1991), "Quinone–Amine Polymers V. Syntheses . . . " Nithianandam, V.S. et al.

*Primary Examiner*—Mark Hellner
*Attorney, Agent, or Firm*—Michael N. Meller

[57] ABSTRACT

A magnetic recording medium has a substrate and an non-magnetic underlayer formed on the substrate and a magnetic layer formed on the non-magnetic layer. The magnetic layer include a magnetic powder and a binder for binding the magnetic powder on the non-magnetic layer. The binder includes at least a resin component containing at least an aminoquinone structure selected from an aminoquinone structure group shown with formulas (1-1) and (1-2) as a constitutional unit. As the magnetic powder, a metal magnetic powder mainly made of Fe and having a saturation magnetization σs is used. The magnetic layer has a saturation flux density Bm of 3500 to 5000 G and a coercive force of 1800 to 3000 Oe and a surface roughness SRa of 1 to 10 nm and a thickness of not more than 1.0 μm.

4 Claims, No Drawings

MAGNETIC RECORDING MEDIUM

BACKGROUND OF THE INVENTION

1. Field of the Invention

This invention relates to improvements of coating type magnetic recording mediums, particularly, relates to the magnetic recording mediums suitable for high density digital signal recording without degradation of electromagnetic conversion characteristics and running durability even when the thickness of the magnetic recording medium is reduced.

2. Description of the Related Arts

Recently, as the demand for high density recording increases, the recorded signal wavelength in the magnetic recording is becoming shorter.

Responding to the demand for the high density recording, there has been proposed a coating type magnetic recording medium employing ferromagnetic metal powder and a deposition type magnetic recording medium employing a metal thin layer as a magnetic layer. Between the two types, the coating type magnetic recording medium is more excellent in productivity and has erosion resistance to the oxidation of the magnetic layer.

As to the high density recording, there is a problem regarding the thickness of the magnetic recording medium.

An excessive thickness of the recording medium causes a reduction of an output level in high frequency signals (short wavelength signals) due to a self-demagnetization loss in recording and a thickness loss in reproduction, thus, an overwriting characteristic is also degraded. Accordingly, the recording medium used for the high density digital recording is required to have a small thickness of the. recording layer. In order to provide a thin recording layer, there is proposed a multilayer recording medium having a non-magnetic layer as an underlayer provided under the recording layer.

Further, in order to satisfy the demands for a long playing time of the recording medium along with demands for the size reduction of the apparatus, attempts to reduce an overall thickness and a width of the recording medium are being made.

However, the reduction of the thickness of the recording medium reduces the stiffness of the recording medium thus degrades a head-medium (for instance, a head-tape) contact characteristic, resulting in degradation of the electromagnetic conversion characteristics.

Therefore, there have been proposed a several countermeasures to improve the head-tape contact characteristic.

Exemplarily, in the Japanese Patent Laid-Open Publication S63-191315/1988, there is proposed an improvement of the head-tape contact characteristic by providing a non-magnetic underlayer containing polyisosyanate so that it serves as a cushion.

Further, in the Japanese Patent Laid-Open Publication H4-325917/1992, there is proposed an improvement wherein a thermosetting polyisocyanate is interposed between the non-magnetic underlayer and the magnetic layer. This proposition intends to improve the head-tape contact characteristic by giving a stiffness to the underlayer.

The abovementioned head-tape improvement methods may be effective in such a case as the underlayer is allowed to be coated at a thickness of 3 $\mu$m, for instance, in the magnetic tape having a total thickness of 13 $\mu$m used in 8 mm VTR. However, the above methods can not be employed in the high density digital recording medium where a further reduction of the thickness thereof (total thickness of 7 $\mu$m) is demanded because the thickness of the underlayer has to be reduced inevitably. This poses the problem of insufficient head-tape contact characteristic.

There has not been realized such a magnetic recording medium as satisfies both conditions of the high density digital recording and the extended playing time without increment of the mass of the medium.

Further, the recording signals to be applied are not limited to high frequency signals (short wavelength signals) in the high density digital recording. Such low frequency signals (long wavelength signals) as control signals are also used. Thus, the recording medium is required to have an excellent output level over a wide range from the low frequency signals to the high frequency signals.

Recently, among the recording mediums aimed at reducing the thickness thereof to improve the overwriting characteristic, there are emerged recording mediums employing the magnetic metal powder having an average long axis length of not more than 0.1 $\mu$m and a saturation magnetization as of not less than 130 emu/g intended to record the short wavelength of not more than 0.5 $\mu$m. However, they do not necessarily display their inherently excellent electro-magnetic conversion characteristics because of difficulty of dispersion of such magnetic particles as highly energized fine particles.

SUMMARY OF THE INVENTION

Accordingly, a general object of the present invention is to provide magnetic recording mediums in which the above disadvantages have been eliminated.

A specific object of the present invention is to provide coating type magnetic recording mediums having excellent head-tape contact characteristics even when the thickness of the magnetic layer is reduced and satisfying conditions of both the high density digital recording and the extension of the playing time without increment of the mass of the medium.

A more specific object of the present invention is to provide magnetic recording mediums having excellent head-tape contact and electromagnetic conversion characteristics in a broad range from low frequencies to high frequencies even when the thickness of the magnetic recording layer is reduced.

Another and specific object of the present invention is to provide magnetic recording mediums having a reduced thickness to allow the high density recording by improving the dispersibility of the fine particles of the metal magnetic powder.

Another and more specific object of the present invention is to provide a magnetic recording medium comprising: a substrate; a non-magnetic underlayer provided on the substrate, the non-magnetic layer comprising a binder and an inorganic powder dispersed in the binder; and a magnetic layer formed on the non-magnetic underlayer, the magnetic layer comprising a magnetic powder and binding means for binding the magnetic powder on the non-magentic layer, the binding means including at least a resin component containing at least an aminoquinone structure selected from an aminoquinone structure group shown with formulas (1-1) and (1-2) as a constitutional unit.

Other objects and further features of the present invention will be apparent from the following detailed description.

DETAILED DESCRIPTION OF THE PREFERRED EMBODIMENTS

A magnetic recording medium of the present invention generally comprises a substrate such as a base film, an underlayer made of a binder containing inorganic powder and a magnetic layer formed on the underlayer. The magnetic layer includes a magnetic powder and a binder for binding the magnetic powder on the underlayer.

One of the main features of the present invention is that the binder for binding the metal ferromagnetic powder on the underlayer includes at least a resin component containing at least an aminoquinone structure selected from an aminoquinone structure group represented by formulas (1-1) and (1-2) as a constitutional unit. This constructive feature secures an excellent head-tape contact and allows the recording medium to apply to the high density digital recording and contributes to extension of the playing time.

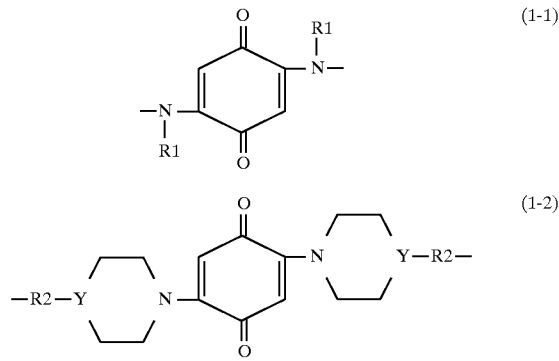

wherein

R1=hydrogen, alkyl group, aralkyl group and phenyl group

R2=alkylene group, phenylene group

Y=N, CH

Further, the magnetic recording medium having excellent reproduction output and overwriting and running characteristics and capable of high density recording is realized by causing the surface roughness "SRa" (average surface roughness) of the magnetic layer to be 1 to 10 nm and the thickness thereof to be not more than 1.0 μm.

Further, in the magnetic layer of the present invention, there is used a metal magnetic powder mainly composed of Fe as the ferromagnetic powder and having a saturation magnetization as of 140 to 200 emu/g.

Further, the magnetic layer of the recording medium has features as follows:

(1) The saturation magnetic flux density Bm in a medium running direction is 3500 to 5000 G.

(2) The coercive force in the medium running direction is 1800 to 3000 Oe.

(3) The surface roughness SRa is 1 to 10 nm.

(4) Thickness is not more than 1.0 μm.

(5) The binder used therein includes at least a resin component containing at least an aminoquinone structure selected from an aminoquinone structure group represented by formulas (1-1) and (1-2) as a constitutional unit.

These features enable to obtain not only excellent head-tape contact characteristics but also excellent reproducing output characteristics over a wide range from low frequency signals to high frequency signals.

Further, in the present invention, there is employed a metal magnetic powder, each particle of which has an average long axis length of 0.038 to 0.08 μm and an average crystallite size of 0.008 to 0.019 μm, as the ferromagnetic powder.

In the magnetic recording medium, the dispersibility of fine particles of the metal magnetic powder is improved, so that excellent electromagnetic conversion characteristics are obtained even when the thickness of the magnetic layer is reduced.

In the coating type magnetic recording medium having a magnetic layer formed by coating a magnetic paint, the resin components in the binder of the magnetic paint often contain various kinds of resins instead of a single kind. This requires to contain at least an aminoquinone structure selected from the aminoquinone group represented by the formulas (1-1) and (1-2) in the resin components as a constitutional unit. The content rate of the aminoquinone represented by the formulas (1-1) and (1-2) in the overall resin components is 0.01 to 40 wt %, preferably 0.1 to 30 wt %. An inadequate content rate thereof displays less improvement of the head-tape contact characteristic and an excessive content rate displays degradation of the mechanical strength of the magnetic layer and a decrease of a pot-life of the magnetic paint.

In the formulas (1-1) and (1-2), "N" is preferably tertiary amine so as to enhance the corrosion resistance of the magnetic powder. As a functional group for enhancing the dispersibility of the fine particles, well-known polar groups may be introduced to the resin component.

Content rate of the resin components containing the aminoquinone to the overall resin components is preferably 5 to 80 wt %.

As the ferromagnetic powder to be used in the magnetic layer, there can be employed well known materials, for instance, $\gamma$-FeOx (x=1.33 to 1.5), Co denatured $\gamma$-FeOx (x=1.33 to 1.5), the alloy powder mainly composed of Fe, Ni and Co, or hexagonal ferrite such as barium ferrite and strontium ferrite.

Other than these elements, there may be included Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, or B.

When the ferromagnetic alloy powder (metal magnetic powder) is employed as the ferromagnetic powder, the aminoquinone structure remarkably exhibits the erosion resistance effect to the magnetic powder.

Dispersion agent and a lubricant and a surface-active agent may be added into the ferromagnetic powder to improve dispersibility of the fine particles and a paint characteristics of the magnetic layer. Lecithin, fatty acid, fatty acid ester, silicone, a coupling agent and the like are available for the purposes.

As the inorganic powders used in magnetic layer, $\alpha$-alumina, $Cr_2O_3$, $\alpha$-$Fe_2O_3$, $TiO_2$, $SiO_2$ and the like are available. As the lubricant used in the magnetic layer, parmitic acid, well-known fatty acid, fatty acid ester, silicone and the like are available.

As the inorganic powder to be used in the non-magnetic layer as the underlayer, $\alpha$-$Fe_2O_3$,$TiO_2$ are available. Other than these materials, inorganic powders of which the particles have a acicular shape, a particle shape, or a plate shape are available.

As carbon black optionally used in the magnetic layer and the underlayer, furnace black, channel black and acetylene black are available.

FIRST EMBODIMENT

Next, a description is given of concrete embodiments from 1-1 to 1-13 of a first embodiment and comparatives from 1-1 to 1-5 as follows. In these embodiments and comparatives, the magnetic tapes having backcoat layers were prepared as the magnetic recording mediums.

Embodiment 1-1

(1) Magnetic Paint for the Magnetic Layer

| | |
|---|---|
| metal magnetic powder: | 100 weight parts |
| (Hc : 1850 Oe, average long axis length: 0.08 μm, σs : 140 emu/g) | |
| polyurethane (a): | 12.5 weight parts |
| (the content rate of the aminoquinone structure represented by the formula (1-1) is 2 wt %, wherein R1 is methyl group) | |
| vinyl chloride resin: | 12.5 weight parts |
| (MR110: Nippon Zeon, no aminoquinone) | |
| α-alumina | 3 weight parts |
| palmitic acid | 1 weight parts |
| methyl ethyl ketone | 100 weight parts |
| cyclohexanone | 100 weight parts |

After being kneaded, the above mixture was dispersed in a sand mill. A magnetic paint for the magnetic layer was prepared by adding 4 weight parts of coronate L (Nippon Polyurethane Co.).

(2) Non-magnetic Paint for the Underlayer

| | |
|---|---|
| acicular α-$Fe_2O_3$: | 100 weight parts |
| average particle diameter: 0.10 μm) | |
| carbon black: | 8 weight parts |
| (average particle diameter: 23 nm) | |
| vinyl chloride resin: | 10 weight parts |
| (MR110: Nippon Zeon) | |
| polyurethane (UR8300: Toyobo) | 10 weight parts |
| α-alumina | 5 weight parts |
| stearic acid | 5 weight parts |
| stearic acid butyl | 7 weight parts |
| methyl ethyl ketone | 100 weight parts |
| cyclohexanone | 100 weight parts |

After the above mixture was dispersed in a sand mill, a non-magnetic paint for the underlayer was prepared by adding 4 weight parts of coronate L (Nippon Polyurethane Co.)

(3) Backcoat Paint

| | |
|---|---|
| carbon black | 100 weight parts |
| (an average primary particle diameter 20 nm) | |
| carbon black | 5 weight parts |
| (an average primary particle diameter 280 nm) | |
| nitrocellulose | 50 weight parts |
| polyurethane (UR8300 Toyobo) | 50 weight parts |
| methyl ethyl ketone | 300 weight parts |
| toluene | 500 weight parts |

After coating the non-magnetic paint as the underlayer on a polyester base film having a thickness of 5.0 μm and a smooth flat surface , the magnetic paint was coated on the underlayer and was oriented and dried. The thicknesses of the underlayer and the magnetic layer were made to be 1.2 μm and 0.3 μm, respectively.

After a surface smoothness treatment was made, a backcoat layer was formed on the opposite surface of the magnetic layer by painting the back coat paint. Thus, the magnetic recording medium of the embodiment 1 was obtained by slitting the base film coated into a width of 6.35 mm.

Embodiment 1-2

The sample of magnetic tape was prepared in the same manner as that of the embodiment 1-1 except for substituting the polyurethane (a) with polyurethane (b) (the content rate of the aminoquinone structure represented by the formula (1-1), wherein R1 is methyl group, is 0.2 wt % ).

Embodiment 1-3

The sample of the magnetic tape was prepared in the same manner as that of the embodiment 1-1 except for substituting the polyurethane (a) with polyurethane (c) (the content rate of the aminoquinone structure represented by the formula (1-1), wherein R1 is methyl group, is 30 wt %).

Embodiment 1-4

The sample of the magnetic tape was prepared in the same manner as that of the embodiment 1-1 except for substituting the polyurethane (a) with polyurethane (d) (the content rate of the aminoquinone structure represented by the formula (1-2), wherein R2 is —$H_2CH_2$—, is 3 wt %).

Embodiment 1-5

The sample of the magnetic tape was prepared in the same manner as that of the embodiment 1-1 except for substituting the polyurethane (a) with polyurethane (e) (the content rate of the aminoquinone structure represented by the formula (1-1), wherein R1 is hydrogen, is 7 wt %).

Embodiment 1-6

The sample of the magnetic tape was prepared in the same manner as that of the embodiment 1-1 except for substituting the polyurethane (a) with polyurethane resin (UR 8300; Toyobo) and substituting the vinyl chloride resin with vinyl chloride/vinyl alcohol copolymer (a) (the content rate of the aminoquinone structure represented by the formula (1-1), wherein R1 is methyl group, is 2 wt %).

Embodiment 1-7

The sample of the magnetic tape was prepared in the same manner as that of the embodiment 1-1 except for substituting the vinyl chloride resin with vinyl chloride/vinyl alcohol copolymer (b) (the content rate of the aminoquinone structure represented by the formula (1-2), wherein R2 is —$CH_2CH_2$—, is 2 wt %).

Embodiments 1-8 to 1-10

The samples of the magnetic tape were prepared in the same manner as that of the embodiment 1-1 except for substituting the surface roughness with different surface roughness of the magnetic layer other than that of the embodiment 1 by adjusting the calenderring conditions. The values of surface roughness SRa (average surface roughness) thereof are shown in Table 1.

Embodiments 1-11 to 1-13

The samples of the magnetic tape were prepared in the same manner as that of the embodiment 1-1 except for substituting the thickness of the magnetic layer with different thicknesses thereof other than that of the embodiment 1 by adjusting the painting conditions. The values of thickness thereof are shown in Table 1.

Comparative 1-1

The sample of the magnetic tape was prepared in the same manner as that of the embodiment 1-1 except for substituting the -polyurethane (a) with polyurethane resin (UR 8300; Toyobo) having no aminoquinone structure.

Comparative 1-2

The sample of the magnetic tape was prepared in the same manner as that of the embodiment 1-1 except for substituting the polyurethane (a) with polyurethane resin (N2304; Nippon Polyurethane) having no aminoquinone structure.

Comparatives 1-3 to 1-4

The samples of the magnetic tape were prepared in the same manner as that of the embodiment 1 except for substituting the surface roughness with different surface roughness of the magnetic layer other than that of the embodiment 1-1 by adjusting the calenderring conditions. The values of surface roughness SRa (average surface roughness) thereof are shown in Table 1.

Comparative 1-5

The sample of the magnetic tape was prepared in the same manner as that of the embodiment 1-1 except for substituting the thickness of the magnetic layer with a thickness of 1.2 μm of the magnetic layer by adjusting the painting conditions.

The characteristics of the magnetic tapes prepared are shown in Table 1.

TABLE 1

|  | surface rough. of mag. layer SRa (nm) | thickness of mag. layer (μm) | coercive force Hc (Oe) | satu. mag. flux density Bm (G) |
|---|---|---|---|---|
| emb.1-1 | 3.1 | 0.30 | 1880 | 4050 |
| 2 | 3.5 | 0.29 | 1890 | 3980 |
| 3 | 2.8 | 0.33 | 1850 | 4080 |
| 4 | 3.1 | 0.29 | 1880 | 4020 |
| 5 | 3.1 | 0.29 | 1890 | 4060 |
| 6 | 3.0 | 0.28 | 1870 | 4030 |
| 7 | 2.9 | 0.33 | 1880 | 4080 |
| 8 | 1.1 | 0.32 | 1830 | 4070 |
| 9 | 5.1 | 0.29 | 1900 | 3980 |
| 10 | 9.6 | 0.27 | 1930 | 3950 |
| 11 | 3.1 | 0.08 | 1870 | 4060 |
| 12 | 3.2 | 0.15 | 1860 | 4050 |
| 13 | 3.3 | 0.95 | 1830 | 4010 |
| com.1-1 | 3.2 | 0.28 | 1850 | 4008 |
| 2 | 3.1 | 0.31 | 1920 | 3200 |
| 3 | 0.7 | 0.26 | 1920 | 3980 |
| 4 | 11.2 | 0.29 | 1870 | 3930 |
| 5 | 3.2 | 1.20 | 1890 | 4010 |

The evaluation of the electromagnetic conversion characteristic of each magnetic tape was performed by using a tape deck equipped with a rotary drum having a diameter of 21.7 mm and a rotational speed of 150 rev./sec. The relative speed between the magnetic tape and the magnetic head was 0.2 m/sec. As the magnetic head, a laminated type magnetic head made of iron nitride was employed. The magnetic head had a saturation flux density Bs of 1.4 T, a track width of 10 μm, and the gap length of 0.18 μm.

The reproduction output level of each magnetic tape was measured by recording a sinusoidal waveform of 20.8 MHz (recorded wavelength of 0.49 μm) thereon using above-mentioned tape deck. The head-tape contact characteristic of each magnetic tape was evaluated by observing an envelope of the waveform of the reproduced signal. The evaluation of the head-tape contact characteristic was performed by using a three step evaluation method (○,Δ,X ), wherein the mark ○ represents the magnetic tape having a normal envelope of the waveform, the mark Δ represents the magnetic tape having an envelope slightly degraded in rise and fall or one having an envelope showing minute disorders thereon or one slightly degraded in the output level as a whole, and the mark X represents the magnetic tape having an envelope fairly degraded in rise and fall, one having a disordered waveform as a whole or one fairly degraded in the output level as a whole. In the viewpoint of a spacing loss, the mark ○ represents the magnetic tape having a small spacing loss, the mark Δ one having a medium spacing loss and the mark X one having a large spacing loss.

An evaluation of the overwriting characteristic was performed in such a manner that after recording a signal of 1 MHz on a track, a recorded signal of 20.8 MHz was additionally recorded on the same track, and a reduction of the reproduction output level of the recorded signal of 1 MHz was measured.

As an evaluation of a tape running characteristic, a kinetic friction coefficient was measured by using a guide pin made of SUS (stainless steel defined in JIS).

The evaluation results thereof are shown in Table 2, wherein the reproduction output levels of 20.8 MHz and the overwriting characteristics are relative values referred to the level of the embodiment 1-1 as 0 dB.

TABLE 2

|  | reproduction output level 20.8 MHz (dB) | head-tape contact | overwriting chara. (dB) | kinetic fric. coefficient |
|---|---|---|---|---|
| emb.1-1 | 0.0 | ○ | 0.0 | 0.22 |
| 2 | −0.1 | ○ | +0.1 | 0.21 |
| 3 | +0.1 | ○ | −0.3 | 0.22 |
| 4 | +0.1 | ○ | +0.1 | 0.21 |
| 5 | 0.0 | ○ | +0.1 | 0.22 |
| 6 | 0.0 | ○ | +0.2 | 0.20 |
| 7 | +0.1 | ○ | −0.3 | 0.20 |
| 8 | +0.4 | ○ | −0.1 | 0.26 |
| 9 | −0.2 | ○ | −0.2 | 0.22 |
| 10 | −0.4 | ○ | −0.2 | 0.20 |
| 11 | +0.3 | ○ | +0.3 | 0.22 |
| 12 | +0.2 | ○ | +0.2 | 0.21 |
| 13 | −0.4 | ○ | −0.5 | 0.20 |
| com.1-1 | −1.5 | X | +0.1 | 0.28 |
| 2 | −2.2 | X | −0.1 | 0.27 |
| 3 | +0.5 | Δ | −0.2 | 0.32 |
| 4 | −1.2 | Δ | −0.1 | 0.22 |
| 5 | −0.6 | ○ | −1.0 | 0.22 |

As seen from Table 2, the magnetic tape of the embodiments 1-1 to 1-13 and the comparatives 1-3 to 1-5 each having the aminoquinone structure show excellent head-tape contact characteristics and reproduction output levels of the signal of 20.8 MHz compared with those of the comparatives 1-1 and 1-2 which have no aminoquinone structure.

However, the magnetic tape of the comparative 1-3 having the aminoquinone structure but having a small surface roughness SRa of 0.7 nm shows a larger kinetic friction coefficient. Thus, it shows a degradation of the tape running characteristic, and a slightly degraded head-tape contact characteristic compared with those of the embodiments 1-1 to 1-13.

On the other hand, the magnetic tape of the comparative 1-4 having the aminoquinone structure but having a larger surface roughness SRa of 11.2 nm (>10 nm) shows a degraded reproduction output level and a slightly degraded head-tape contact characteristic compared with those of the embodiments 1-1 to 1-13.

The magnetic tapes of the embodiments 1-8 to 1-10 provided with magnetic layers having surface roughness SRa of 1.1, 5.1 and 9.6 nm, respectively, show excellent reproduction output levels in the high frequencies as well as excellent running characteristics maintaining excellent head-tape contact characteristic though they have the same condition as those of the comparatives 1-3 and 1-4 except for the surface roughness.

Accordingly, it is preferable to employ the magnetic layer not only having the resin component including the aminoquinone structure but also having the surface roughness SRa of 1 to 10 nm when not only the head-tape contact but also both the reproduction output level and the overwriting characteristic of the magnetic tape are important.

The comparative 1-5 having a magnetic layer of thickness of 1.20 μm (>1.0 μm), though it contains the aminoquinone structure, is degraded in the reproduction output levels of the high frequencies and in the overwriting characteristic compared with those of the embodiments 1-1 to 1-13.

On the other hand, the magnetic tapes of the embodiments 1-11 to 1-13 provided with magnetic layers having thicknesses of 0.08, 0.15 and 0.95 μm, respectively show excellent characteristics both in the reproduction output levels of the high frequencies and in the overwriting characteristics though they have the same condition as that of the comparative 1-5 except for the thicknesses.

Accordingly, it is preferable to employ the magnetic layer not only having the resin component including the aminoquinone structure but also having the thickness of not more than 1.0 μm, preferably not more than 0.3 μm when not only the head-tape contact characteristic but also both the reproduction output level and the overwriting characteristic of the magnetic tape are important.

SECOND EMBODIMENT

A second embodiment of the present invention relates to a coating type magnetic recording medium such as a magnetic tape, and a magnetic powder used in the magnetic layer.

In order to realize a high electromagnetic conversion characteristic in the magnetic medium, it is effective to employ a magnetic powder made of fine particles having high magnetic characteristic.

Thus, the inventors of the present invention propose a magnetic medium employing a magnetic powder having a saturation magnetization σs of 140 to 200 emu/g.

When employing the magnetic powder having the saturation magnetization σs of less than 140 emu/g in the magnetic layer, it is impossible to obtain the magnetic layer having a sufficient saturation magnetic flux density Bm. When the magnetic powder having the saturation magnetization σs of more than 200 emu/g is employed, it is impossible to fabricate it into the magnetic medium because the magnetic powder has less erosion resistance and is difficult to be handled in the fabrication process.

When the saturation magnetic flux density Bm of the magnetic layer in a medium running direction (a longitudinal direction) of the magnetic medium is less than 3500 G, it is impossible to obtain a recording medium capable of outputting a large reproduction output level.

On the other hand, in order to suppress defects (falling off of magnetic particles) developed in the magnetic layer, the saturation magnetic flux density Bm needed to be not more than 5000 G.

As to the coercive force Hc of the magnetic layer in the medium running direction (longitudinal direction), when it was less than 1800 Oe, the reproduction output levels in the high frequencies was degraded, when more than 3000 Oe, the overwriting characteristic was degraded though the thickness of the magnetic layer was not more than 0.3 μm.

As to the surface roughness SRa of the magnetic layer, when it was less than 1 nm, the running characteristic of the medium was degraded, and when more than 10 nm, the running characteristic thereof was degraded along with the reduction of reproduction output levels in the high signal frequency because of an increase of the spacing loss. Further, the head-medium (head-tape) contact characteristic was also degraded.

As to the thickness of the magnetic layer, it is preferably not more than 1.0 μm to prevent the degradation of the overwriting characteristic.

The thickness of the magnetic layer is preferably 0.05 to 0.3 μm from the viewpoint of emphasizing both excellent output levels all over the signal frequencies and excellent overwriting characteristic.

Next, a description is given of the concrete embodiments 2-1 to 2-17 and the comparatives 2-1 to 2-9 of the second embodiment as follows.

Embodiment 2-1

The sample of magnetic tape was prepared in the same manner as that of the embodiment 1-1 in the first embodiment except for substituting the metal magnetic powder with metal powder (a) shown in Table 3.

Embodiments 2-2 to 2-5

The samples of magnetic tapes were prepared in the same manner as that of the embodiment 2-1 except for substituting the metal magnetic powder (a) with metal magnetic powders (b) to (e) shown in Table 3, respectively.

Embodiments 2-6 to 2-7

The samples of magnetic tapes were prepared in the same manner as the of the embodiment 2-1 except for substituting the surface roughness SRa of the magnetic layer with the surface roughness as shown in Table 4, respectively, by adjusting calenderring conditions.

Embodiments 2-8 to 2-10

The samples of magnetic tapes were prepared in the same manner as that of the embodiment 2-1 except for substituting the thickness of the magnetic layer with the thicknesses as shown in Table 4, respectively, by adjusting coating conditions.

Embodiment 2-11

The sample of magnetic tape was prepared in the same manner as that of the embodiment 2-1 except for substituting the polyurethane (a) with polyurethane (d) (the content rate of the aminoquinone structure represented by the formula (1-2), wherein R2 is —$CH_2$ $CH_2$—, is 3 wt %).

Embodiment 2-12

The sample of magnetic tape was prepared in the same manner as that of the embodiment 2-1 except for substituting the polyurethane (a) with polyurethane (b) (the content rate of the aminoquinone structure represented by the formula (1-1), wherein R1 is methyl group, is 0.2 wt %).

Embodiment 2-13

The sample of magnetic tape was prepared in the same manner as that of the embodiment 2-1 except for substituting the polyurethane (a) with polyurethane (c) (the content rate of the aminoquinone structure represented by the formula (1-1), wherein R1 is methyl group, is 30 wt %).

Embodiment 2-14

The sample of magnetic tape was prepared in the same manner as that of the embodiment 2-1 except for substituting the polyurethane (a) with polyurethane (e) (the content rate of the aminoquinone structure represented by the formula (1-1), wherein R1 is hydrogen, is 7 wt %).

Embodiment 2-15

The samples of magnetic tape were prepared in the same manner as that of the embodiment 2-1 except for substituting the polyurethane (a) with polyurethane resin (UR 8300; Toyobo) having no aminoquinone structure and substituting the vinyl chloride resin with vinyl chloride/vinyl alcohol copolymer (a) (the content rate of the aminoquinone structure represented by the formula (1-1) wherein R1 is methyl group, is 2 wt %).

Embodiment 2-16

The samples of magnetic tape were prepared in the same manner as that of the embodiment 2-1 except for substituting the vinyl chloride resin with vinyl chloride/vinyl chloride copolymer (b) (the content rate of the aminoquinone structure represented by the formula (1-2), wherein R2 is —CH$_2$CH$_2$—, is 2 wt %).

Embodiment 2-17

The sample of magnetic tape was prepared in the same manner as that of the embodiment 2-1 except for substituting acicular particles of $\alpha$-Fe$_2$O$_3$ used in the non-magnetic underlayer with round particles of TiO$_2$ (an average particle diameter: 0.08 $\mu$m).

Comparative 2-1

The sample of magnetic tape was prepared in the same manner as that of the embodiment 2-1 except for substituting the polyurethane (a) with polyurethane resin (UR8300; Toyobo) having no aminoquinone structure.

Comparative 2-2

The sample of magnetic tape was prepared in the same manner as that of the embodiment 2-1 except for substituting the polyurethane (a) with polyurethane resin (N2304; Nippon Polyurethane) having no aminoquinone structure.

Comparative 2-3 to 2-5

The samples of magnetic tapes were prepared in the same manner as that of the embodiment 2-1 except for substituting the metal magnetic powder (a) with metal magnetic powders (f) to (h) shown in Table 3, respectively.

Comparative 2-6 to 2-7

The samples of magnetic tapes were prepared in the same manner as that of the embodiment 2-1 except for substituting the surface roughness SRa of the magnetic layer with surface roughness shown in Table 4, respectively, by adjusting the calenderring conditions.

Comparative 2-8 to 2-9

The samples of magnetic tapes were prepared in the same manner as that of the embodiment 2-1 except for substituting the thickness of the magnetic layer with the thicknesses shown in Table 4, respectively, by adjusting the coating conditions.

The magnetic characteristics of metal magnetic powders (a) to (h) used in the embodiments and the comparatives are shown in Table 3. The average long axis length of the magnetic particles was about 0.08 $\mu$m. The characteristics of the magnetic tapes are shown in Table 4.

TABLE 3

| metal mag. powder | satu. magnetiz. σs (emu/g) | coercive force Hc (Oe) |
|---|---|---|
| (a) | 160 | 2130 |
| (b) | 198 | 2100 |
| (c) | 142 | 2150 |
| (d) | 161 | 2850 |
| (e) | 162 | 1800 |
| (f) | 135 | 2200 |
| (g) | 162 | 2900 |
| (h) | 161 | 1650 |

| | surface rough. of mag. layer SRa (nm) | thickness of mag. layer ($\mu$m) | coercive force Hc (Oe) | satu. mag. flux density Bm (G) |
|---|---|---|---|---|
| emb.2-1 | 3.2 | 0.20 | 2170 | 4200 |
| 2 | 2.9 | 0.21 | 2130 | 4950 |
| 3 | 3.1 | 0.19 | 2250 | 3600 |
| 4 | 3.0 | 0.21 | 2950 | 4220 |
| 5 | 2.8 | 0.22 | 1850 | 4280 |
| 6 | 1.1 | 0.21 | 2140 | 4300 |
| 7 | 9.8 | 0.22 | 2200 | 4120 |
| 8 | 3.1 | 0.05 | 2180 | 4210 |
| 9 | 2.9 | 0.30 | 2200 | 4250 |
| 10 | 3.1 | 0.40 | 2170 | 4180 |
| 11 | 3.2 | 0.22 | 2170 | 4220 |
| 12 | 3.0 | 0.21 | 2200 | 4180 |
| 13 | 3.1 | 0.19 | 2140 | 4250 |
| 14 | 3.0 | 0.21 | 2210 | 4180 |
| 15 | 3.2 | 0.22 | 2190 | 4150 |
| 16 | 3.1 | 0.19 | 2240 | 4190 |
| 17 | 3.1 | 0.20 | 2170 | 4200 |

The evaluation of each magnetic tape was performed in the same manner as mentioned in the foregoing referring to Table 2. The reproduction output levels were also measured with a recording signal of 1 MHz (a recording wavelength of 10.19 $\mu$m) in addition to the recording signal of 20.8 MHz (a recording wavelength of 0.49 $\mu$m). The results are shown in Table 5, wherein the reproduction output levels of the recording signals of 1 MHz and 20.8 MHz and the overwriting characteristics are relative values referred to the level of the embodiment 2-1 as 0 dB.

TABLE 5

| | reproduction O.P. level (dB) | | head-tape contact | overwriting chara. (dB) | kinetic fric. coefficient |
|---|---|---|---|---|---|
| | 1 MHz | 20.8 MHz | | | |
| emb.2-1 | 0.0 | 0.0 | ○ | 0.0 | 0.22 |
| 2 | 0.4 | 0.1 | ○ | 0.1 | 0.21 |
| 3 | -0.2 | -0.1 | ○ | 0.0 | 0.22 |
| 4 | 0.1 | 0.4 | ○ | -0.2 | 0.21 |
| 5 | 0.2 | -0.2 | ○ | 0.2 | 0.20 |
| 6 | 0.1 | 0.0 | ○ | 0.1 | 0.20 |
| 7 | -0.1 | 0.1 | ○ | 0.3 | 0.22 |
| 8 | -0.2 | 0.2 | ○ | -0.2 | 0.22 |
| 9 | 0.1 | 0.0 | ○ | -0.1 | 0.20 |
| 10 | 0.2 | -0.2 | ○ | -0.4 | 0.22 |
| 11 | 0.1 | 0.1 | ○ | 0.1 | 0.22 |
| 12 | -0.1 | 0.1 | ○ | -0.1 | 0.21 |
| 13 | 0.0 | 0.1 | ○ | 0.1 | 0.20 |
| 14 | 0.0 | 0.1 | ○ | 0.1 | 0.22 |
| 15 | -0.1 | 0.0 | ○ | 0.0 | 0.22 |
| 16 | 0.0 | 0.1 | ○ | 0.1 | 0.21 |
| 17 | 0.1 | -0.1 | ○ | 0.0 | 0.20 |

TABLE 5-continued

| | reproduction O.P. level (dB) | | head-tape contact | overwriting chara. (dB) | kinetic fric. coefficient |
|---|---|---|---|---|---|
| | 1 MHz | 20.8 MHz | | | |
| com.2-1 | −0.2 | −1.5 | X | −0.3 | 0.28 |
| 2 | −0.2 | −2.2 | X | −0.6 | 0.27 |
| 3 | −0.8 | −0.3 | ○ | −0.2 | 0.22 |
| 4 | −0.4 | 0.5 | ○ | −0.8 | 0.22 |
| 5 | 0.3 | −0.8 | ○ | 0.4 | 0.22 |
| 6 | 0.1 | 0.2 | ○ | 0.2 | 0.32 |
| 7 | −0.1 | −0.5 | Δ | −0.3 | 0.28 |
| 8 | −1.4 | −0.6 | ○ | 0.3 | 0.22 |
| 9 | 0.2 | −0.2 | ○ | −1.4 | 0.22 |

As seen from Table 5, the comparatives 2-1 and 2-2 having no aminoquinone structure in the resin components are degraded in the head-tape contact characteristics compared with those of the embodiments containing the aminoquinone structures.

The comparative 2-3 employing the magnetic powder having a low saturation magnetization σs of 135 emu/g (<140 emu/g) and having the magnetic layer of a low magnetic flux density Bm of 3315 G (<3500 G) in the tape running direction has lower reproduction output levels both of the high frequency signal and of the low frequency signal compared with each embodiment.

The comparative 2-5 having the magnetic layer of the low coercive force of 1720 Oe (<1800 Oe) has a degraded output level in the high frequency signal compared with each embodiment. On the other hand, the comparative 2-4 having the magnetic layer of a high coercive force of 3150 Oe (>3000 Oe) is degraded in the overwriting characteristic and in the output of the low frequency signal compared with each embodiment though the magnetic layer has a small thickness of 0.22 μm.

The comparative 2-6 having a small surface roughness SRa of 0.7 nm (<1 nm) on the magnetic layer, has a large kinetic friction coefficient, resulting in degradation in the tape running characteristic compared with each embodiment. On the other hand, the comparative 2-7 having a large surface roughness SRa of 11.0 nm (10 nm) is degraded in the tape running characteristic and in the head-tape contact characteristic though it contains the aminoquinone structure in the resin components. Further the comparative 2-7 is degraded especially in the reproduction output level of the high frequency signal due to an increase of the spacing loss in the recording and the reproduction.

The comparative 2-8 having the magnetic layer of small thickness of 0.02 μm (<0.05 μm) has poorer output levels of both the high frequency signals and the low frequency signal compared with each embodiment.

On the other hand, the comparative 2-9 having a large thickness of 1.20 μm (>1.0 μm) is largely degraded in the overwriting characteristic.

Each of the embodiments 2-1 to 2-17 has an excellent head-tape contact characteristic though each of them has a small thickness of the magnetic layer, because it has at least one of the aminoquinone structures represented by the formulas (1-1) and (1-2) in its resin component.

Further, each of the embodiments employs a metal magnetic powder mainly made of Fe and having a saturation magnetization σs of 140 to 200 emu/g for the magnetic layer and the magnetic layer having a saturation magnetization Bm of 3500 to 5000 G in the tape running direction, a coercive force Hc of 1800 to 3000 Oe in the tape running direction, a surface roughness SRa of 1 to 10 nm and a thickness of not more than 1.0 μm, so that each of the embodiments has excellent reproduction output levels over a wide range from low frequency signals to high frequency signals, excellent overwriting characteristic and excellent tape running characteristic.

Accordingly, each embodiment has a high performance, and is suitable to the recording medium for the high density digital recording capable of extending the playing time and reducing an overall size of the recording and reproducing apparatus.

THIRD EMBODIMENT

In the third embodiment, a metal magnetic powder having an average long axis length of 0.038 to 0.08 μm and an average crystallite size of 0.008 to 0.019 μm is employed as the magnetic powder in the magnetic layer. The metal magnetic powder has a surface area of 25 to 80 m$^2$/g by BET method, preferably a surface area of 35 to 75 m$^2$/g. When the surface area is less than 25 m$^2$/g, a noise level of the magnetic tape is increased, and when it is more than 80 m$^2$/g, an acceptable surface smoothness of the magnetic layer can not be readily attained. Further, the magnetic layer has preferably a surface roughness SRa of 1 to 10 nm and preferably a thickness of not more than 1.0 μm, more preferably not more than 0.2 μm.

Next, a description is given of concrete embodiments from 3-1 to 3-6 of the third embodiment and comparatives from 3-1 to 3-11 as follows. In these embodiments and comparatives, the magnetic tapes having backcoat layers were prepared as the magnetic recording medium.

Embodiment 3-1

(1) Magnetic Paint Compositions for the Magnetic Layer

| | |
|---|---|
| metal magnetic powder: | 100 weight parts |
| (composition; Fe: 70 to 90%, Co: 10% to 30% | |
| an average long axis length: 0.038 μm, | |
| an average crystallite size: 0.008 μm | |
| coercive force Hc: 166 kA/m, | |
| saturation magnetization σs: 134 emu/g | |
| polyurethane: | 12.5 weight parts |
| (the content rate of the aminoquinone structure | |
| represented by the formula (1-1), wherein R1 is | |
| methyl group, is 2 wt %) | |
| vinyl chloride resin: | 12.5 weight parts |
| (MR110: Nippon Zeon, no aminoquinone) | |
| α-alumina | 3 weight parts |
| myristic acid | 1 weight parts |
| butyl stearate | 1 weight part |
| methyl ethyl ketone | 100 weight parts |
| cyclohexanone | 100 weight parts |

After being kneaded, the above mixture was dispersed in a sand mill. A magnetic paint for the magnetic layer was prepared by adding 4 weight parts of coronate L (Nippon Polyurethane Co.).

(2) Non-magnetic Paint for the Underlayer

| | |
|---|---|
| acicular α-Fe$_2$O$_3$: | 100 weight parts |
| average particle diameter: 0.10μm) | |
| carbon black: | 8 weight parts |
| (average particle diameter: 23 nm) | |
| vinyl chloride resin: | 10 weight parts |
| (MR110: Nippon Zeon) | |

-continued

| | |
|---|---|
| polyurethane (UR8300: Toyobo) | 10 weight parts |
| α-alumina | 5 weight parts |
| stearic acid | 5 weight parts |
| stearic acid butyl | 7 weight parts |
| methyl ethyl ketone | 100 weight parts |
| cyclohexanone | 100 weight parts |

After the above mixture was dispersed in a sand mill, a non-magnetic paint for the underlayer was prepared by adding 4 weight parts of coronate L (Nippon Polyurethane Co.).

(3) Backcoat Paint

| | |
|---|---|
| carbon black (an average primary particle diameter 20 nm) | 100 weight parts |
| carbon black (an average primary particle diameter 280 nm) | 5 weight parts |
| nitrocellulose | 50 weight parts |
| polyurethane (UR8300 Toyobo) | 50 weight parts |
| methyl ethyl ketone | 300 weight parts |
| toluene | 500 weight parts |

After coating the non-magnetic paint on a polyester base film having a thickness of 5.0 μm and a smooth flat surface to form the underlayer, the magnetic paint was coated on the underlayer and was oriented and dried. The thickness of the underlayer and the magnetic layer were made to be 1.5 μm and 0.13 μm, respectively.

After a surface smoothness treatment was made, a back-coat layer having a thickness of 0.3 μm was provided on the opposite surface of the magnetic layer by painting a backcoat paint. Thus, a magnetic recording tape of the embodiment 1 was obtained by slitting the base film coated into a width of 6.35 mm.

Embodiment 3-2

The sample of magnetic tape was prepared in the same manner as that of the embodiment 3-1 in the third embodiment except for substituting the metal magnetic powder with a metal powder having an average long axis length of 0.065 μm, an average crystallite size of 0.0155 μm, a coercive force Hc of 181 kA/m and a saturation magnetization σs of 138 emu/g.

Embodiment 3-3

The sample of magnetic tape was prepared in the same manner as that of the embodiment 3-1 except for substituting with the metal magnetic powder having an average long axis length of 0.08 μm and an average crystalline size of 0.019 μm, a coercive force Hc of 185 kA/m and a saturation magnetization σs of 148 emu/g.

Embodiment 3-4

The sample of magnetic tape was prepared in the same manner as that of the embodiment 3-1 except for substituting the polyurethane with polyurethane (UR8300; Toyobo) having no aminoquinone structure and substituting the vinyl chloride (MR110: Nippon Zeon) with vinyl chloride/vinyl alcohol copolymer containing the aminoquinone structure represented by the formula (1-2), (wherein R2 is —CH$_2$CH$_2$—) of which the content rate is 2 wt %.

Embodiment 3-5

The sample of magnetic tape was prepared in the same manner as that of the embodiment 3-1 except for substituting the metal magnetic powder with a metal powder having an average long axis length of 0.065 μm, an average crystallite size of 0.0155 μm, a coercive force Hc of 181 kA/m and a saturation magnetization σs of 138 emu/g, and substituting the content rate of the aminoquinone structure contained in the polyurethane with the content rate of 0.2 wt %.

Embodiment 3-6

The sample of magnetic tape was prepared in the same manner as that of the embodiment 3-1 except for substituting the metal magnetic powder with a metal powder having an average long axis length of 0.065 μm and an average crystallite size of 0.0155 μm and a coercive force Hc of 181 kA/m and a saturation magnetization σs of 138 emu/g and substituting the content rate of the aminoquinone structure contained in the polyurethane with the content rate of 30 wt %.

Comparative 3-1

The sample of magnetic tape was prepared in the same manner as that of the embodiment 3-1 except for substituting the metal magnetic powder with a metal powder having an average long axis length of 0.035 μm, an average crystallite size of 0.0085 μm, a coercive force Hc of 170 kA/m and a saturation magnetization σs of 129 emu/g.

Comparative 3-2

The sample of magnetic tape was prepared in the same manner as that of the comparative 3-1 except for substituting the polyurethane with polyurethane (UR8300; Toyobo) having no aminoquinone structure.

Comparative 3-3

The sample of magnetic tape was prepared in the same manner as that of the embodiment 3-1 except for substituting the polyurethane with polyurethane (UR8300; Toyobo) having no aminoquinone structure.

Comparative 3-4

The sample of magnetic tape was prepared in the same manner as that of the embodiment 3-2 except for substituting the polyurethane with polyurethane (UR8300; Toyobo) having no aminoquinone structure.

Comparative 3-5

The sample of magnetic tape was prepared in the same manner as that of the embodiment 3-3 except for substituting the polyurethane with polyurethane (UR8300; Toyobo) having no aminoquinone structure.

Comparative 3-6

The sample of magnetic tape was prepared in the same manner as that of the embodiment 3-1 except for substituting the metal magnetic powder with a metal powder having an average long axis length of 0.11 μm, an average crystallite size of 0.019 μm, a coercive force Hc of 180 kA/m and a saturation magnetization σs of 135 emu/g.

Comparative 3-7

The sample of magnetic tape was prepared in the same manner as that of the comparative 3-6 except for substituting the polyurethane with polyurethane (UR8300; Toyobo) having no aminoquinone structure.

Comparative 3-8

The sample of magnetic tape was prepared in the same manner as that of the embodiment 3-1 except for substituting the metal magnetic powder with a metal powder having an average long axis length of 0.08 μm, an average crystallite size of 0.0205 μm, a coercive force Hc of 159 kA/m and a saturation magnetization σs of 140 emu/g.

Comparative 3-9

The sample of magnetic tape was prepared in the same manner as that of the comparative 3-8 except for substituting the polyurethane with polyurethane (UR8300; Toyobo) having no aminoquinone structure.

Comparative 3-10

The sample of magnetic tape was prepared in the same manner as that of the embodiment 3-1 except for substituting the metal magnetic powder with a metal powder having an average long axis length of 0.038 μm, an average crystallite size of 0.007 μm, a coercive force Hc of 175 kA/m and a saturation magnetization σs of 130 emu/g.

Comparative 3-11

The sample of magnetic tape was prepared in the same manner as that of the comparative 3-10 except for substituting the polyurethane with polyurethane (UR8300; Toyobo) having no aminoquinone structure.

Evaluation of electromagnetic conversion characteristic of each magnetic tape was conducted by using a video deck equipped with a rotary drum having a diameter of 21.7 mm and a rotational speed of 150 revol./sec. Relative speed between the magnetic tape and the magnetic head was 10.2 m/s. As the magnetic head, a laminated type head made of iron nitride was used. The magnetic head had a saturation magnetic flux density of 1.4 T and a track width of 10 μm and a gap length of 0.18 μm.

After a sinusoidal waveform of 20.8 MHz (recording wavelength of 0.49 μm) was recorded on each magnetic tape by using the video deck, a C/N value regarding each magnetic tape was obtained by comparing the reproduction output level thereof with a noise level of 18.8 MHz. The results are shown in Table 6.

TABLE 6

| | magnetic powder | | | | |
|---|---|---|---|---|---|
| | average long axis leng. (μm) | ave.cryst. size (μm) | coerc. force (kA/m) | sartura. magnetiz. (emu/g) | 20.8 MHz C/N (dB) |
| emb.3-1 a | 0.038 | 0.008 | 166 | 134 | +0.6 |
| 2 a | 0.065 | 0.0155 | 181 | 138 | +0.8 |
| 3 a | 0.08 | 0.019 | 185 | 148 | +0.4 |
| 4 b | 0.038 | 0.008 | 166 | 134 | +0.9 |
| 5 a | 0.065 | 0.0155 | 181 | 138 | +0.7 |
| 6 a | 0.065 | 0.0155 | 181 | 138 | +0.9 |
| com.3-1 a | 0.035 | 0.0085 | 170 | 129 | −0.5 |
| 2 c | 0.035 | 0.0085 | 170 | 129 | −0.3 |
| 3 c | 0.038 | 0.008 | 166 | 134 | −0.3 |
| 4 c | 0.065 | 0.0155 | 181 | 138 | −0.1 |
| 5 c | 0.08 | 0.019 | 185 | 148 | −0.2 |
| 6 a | 0.11 | 0.019 | 180 | 135 | +0.2 |
| 7 c | 0.11 | 0.019 | 180 | 135 | +0.1 |
| 8 a | 0.08 | 0.0205 | 159 | 140 | −0.1 |
| 9 c | 0.08 | 0.0205 | 159 | 140 | −0.6 |
| 10 a | 0.038 | 0.007 | 175 | 130 | −0.3 |
| 11 c | 0.038 | 0.007 | 175 | 130 | −0.4 |

Note: a; polyurethane resin containing aminoquinone structure.
b; vinyl chloride/vinyl alcohol copolymer containing aminoquinone structure.
c; well-known polyurethane resin containing no aminoquinone structure.

As seen from Table 6, both the comparatives 3-1 and 3-2 employing magnetic powders each of which has a small average long axis length of 0.035 μm, are degraded in dispersibility of the magnetic particles because they show small values of C/N. As there is little difference in the values of C/N between the comparatives 3-1 and 3-2, it will be understood that the dispersibility of the magnetic powder is scarcely improved even when the aminoquinone structure is introduced into the resin component.

The comparatives 3-6 and 3-7 employing magnetic powders each having a large average of long axis length of 0.11 μm, show better values of C/N compared with other comparatives, but show worse values thereof compared with those of the embodiments 3-1 to 3-6. As there is little difference in the values of C/N between the comparatives 3-6 and 3-7, it will be also understood that the dispersibility of the magnetic powder is scarcely improved even when the aminoquinone structure is introduced into the resin component.

The comparatives 3-10 and 3-11 employing magnetic powders, each having a small average crystallite size of 0.007 μm, are degraded in the dispersibility of the magnetic powder because they show the smaller values of C/N.

As there is little difference in the values of C/N between the comparatives 3-10 and 3-11, it will be understood that the dispersibility of the magnetic powder is scarcely improved even when the aminoquinone structure is introduced into the resin component.

The comparatives 3-8 and 3-9 employing the magnetic powder, each having a large average crystallite size of 0.0205 μm, are degraded in the values of C/N because of degradation of surface conditions of their magnetic layers. The comparative 3-8 is fairly improved in the value of C/N due to the introduction of the aminoquinone structure, however, it is degraded compared with those of the embodiments 3-1 to 3-6

As seen from the comparisons of three groups i.e., (the embodiment 3-1 and the comparative 3-3), (the embodiment 3-2 and the comparative 3-4), and (the embodiment 3-3 and the comparative 3-5), wherein the difference between the embodiment and the comparative in each group is only existence of an aminoquinone or not, the improved effect of values of C/N due to the introduction of the aminoquinone structure into the resin components is larger to the magnetic powder having an average long axis length within a range of 0.038 to 0.08 μm and an average crystallite size within a range of 0.008 to 0.019 μm because of its excellent dispersibility. Each embodiment shows sufficiently high value of C/N.

Further, the embodiments 3-4, 3-5, and 3-6 (in the embodiments 3-1 and 3-2, the content rates of the aminoquinone and the type of the resin component to be added with the aminoquinone are only changed) show also sufficiently large values of C/N, thus the dispersibility of magnetic powder is largely improved therein.

According to the magnetic recording medium of the third embodiment of the present invention, the magnetic recording medium comprises a support, an underlayer containing inorganic particles in the resin formed on the support, and a magnetic layer formed on the underlayer by being coated with a magnetic paint containing ferromagnetic powder, wherein (1) the magnetic layer comprises a magnetic powder and binding means for binding the magnetic powder on the underlayer, the binding means including at least a resin component containing at least an aminoquinone structure selected from an aminoquinone structure group shown with formulas (1-1) and (1-2).

(2) the magnetic powder is made of a metal magnetic powder having an average long axis length of 0.038 to 0.08 μm and an average crystallite size of 0.008 to 0.019 μm.

The above magnetic recording medium has a excellent dispersibility of the fine magnetic powder, thus it is possible to provide the magnetic recording medium having excellent electromagnetic conversion characteristics.

Accordingly, it is possible to provide a magnetic recording medium having a small thickness of the magnetic layer capable of high-density recording by using the fine metal magnetic powder.

What is claimed is:

1. A magnetic recording medium comprising:

a substrate:

a non-magnetic underlayer provided on the substrate, the non-magnetic layer comprising a binder and an inorganic powder dispersed in the binder; and a magnetic layer formed on the non-magnetic underlayer, the magnetic layer comprising a magnetic powder and binding means for binding the magnetic powder on the non-magnetic underlayer, the binding means including at least a resin component containing at least an aminoquinone structure selected from an aminoquinone structure group shown with formulas (1-1) and (1-2) as a constitutional unit,

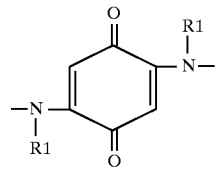
(1-1)

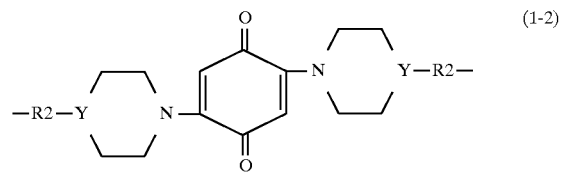
(1-2)

wherein

R1=hydrogen, alkyl group, aralkyl group and phenyl group

R2=alkylene group, phenylene group

Y=N,CH wherein the thickness of the magnetic later is not more than 1.0 μm.

2. A magnetic recording medium as claimed in claim 1, wherein a surface roughness SRa of the magnetic layer is 1 to 10 nm.

3. A magnetic recording medium as claimed in claim 1, wherein the ferromagnetic powder is a metal magnetic powder mainly made of Fe and having a saturation magnetization σs of 140 to 200 emu/g, and the magnetic layer has a magnetic flux density Bm of 3500 to 5000 G and a coercive force Hc of 1800 to 3000 Oe in a medium running direction.

4. A magnetic recording medium as claimed in claim 1, wherein the ferromagnetic powder is a metal magnetic powder having an average long axis length of 0.038 to 0.08 μm and an average crystallite size of 0.008 to 0.019 μm.

* * * * *